US008928521B2

(12) United States Patent
Venkatachalam et al.

(10) Patent No.: US 8,928,521 B2
(45) Date of Patent: Jan. 6, 2015

(54) STORM ADVECTION NOWCASTING

(75) Inventors: Chandrasekaran Venkatachalam, Fort Collins, CO (US); Yanting Wang, Aurora, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 843 days.

(21) Appl. No.: 13/000,600

(22) PCT Filed: Jun. 25, 2009

(86) PCT No.: PCT/US2009/048576
§ 371 (c)(1),
(2), (4) Date: May 2, 2011

(87) PCT Pub. No.: WO2009/158458
PCT Pub. Date: Dec. 30, 2009

(65) Prior Publication Data
US 2011/0267224 A1    Nov. 3, 2011

Related U.S. Application Data

(60) Provisional application No. 61/075,486, filed on Jun. 25, 2008.

(51) Int. Cl.
*G01S 13/00* (2006.01)
*G01S 13/95* (2006.01)
(52) U.S. Cl.
CPC ............ *G01S 13/951* (2013.01); *G01S 13/953* (2013.01)
USPC ........................................................ 342/26 R

(58) Field of Classification Search
CPC ...... G01S 13/953; G01S 13/951; G01S 13/95
USPC .......................................................... 342/26 R
See application file for complete search history.

(56) References Cited

U.S. PATENT DOCUMENTS

| 4,649,388 | A | 3/1987 | Atlas | |
|---|---|---|---|---|
| 5,311,183 | A | 5/1994 | Mathews et al. | |
| 7,307,577 | B1 | 12/2007 | Kronfeld et al. | |
| 2004/0201515 | A1* | 10/2004 | Testud et al. | 342/26 R |
| 2004/0210617 | A1 | 10/2004 | Vetterli et al. | |
| 2005/0093734 | A1* | 5/2005 | Alford et al. | 342/26 R |
| 2006/0097907 | A1* | 5/2006 | Fischer et al. | 342/26 R |
| 2006/0145912 | A1* | 7/2006 | Makkapati et al. | 342/26 R |
| 2006/0202884 | A1* | 9/2006 | Makkapati et al. | 342/26 R |
| 2006/0202886 | A1* | 9/2006 | Mahapatra et al. | 342/176 |
| 2007/0103359 | A1* | 5/2007 | Testud et al. | 342/26 R |
| 2007/0152867 | A1* | 7/2007 | Randall | 342/26 R |

(Continued)

OTHER PUBLICATIONS

International Search Report and Written Opinion of PCT/US2009/048576 mailed on Sep. 1, 2009, 7 pages.

*Primary Examiner* — Frank J McGue
(74) *Attorney, Agent, or Firm* — Maschoff Brennan

(57) ABSTRACT

Embodiments of the invention can predict the ground location and intensity of storm cells for a future time using radar reflectivity data. In some embodiments, a Sinc approximation of the general flow equation can be solved to predict the ground location and intensity of a storm cell. In some embodiments, to solve the Sinc approximation the velocity of a storm cell can be estimated using various techniques including solving the flow equation in the frequency domain. The results can provide efficient prediction of storm cell position in nowcasting applications.

15 Claims, 9 Drawing Sheets

(56) References Cited

U.S. PATENT DOCUMENTS

| | | | |
|---|---|---|---|
| 2007/0222660 A1* | 9/2007 | Stagliano et al. | 342/26 R |
| 2007/0222661 A1* | 9/2007 | Stagliano et al. | 342/26 R |
| 2007/0236383 A1* | 10/2007 | Makkapati et al. | 342/26 R |
| 2008/0001808 A1* | 1/2008 | Passarelli et al. | 342/26 R |

* cited by examiner

STORM ADVECTION NOWCASTING

CROSS-REFERENCES TO RELATED APPLICATIONS

This application claims the benefit of, U.S. Provisional Patent Application Ser. No. 61/075,486, entitled "Efficient Storm Advection Algorithm For Nowcasting," filed Jun. 25, 2008, and PCT/US09/48576, entitled "Storm Advection Nowcasting," filed Jun. 25, 2009, the entire disclosure of which are incorporated herein by reference for all purposes.

STATEMENT AS TO RIGHTS TO INVENTIONS MADE UNDER FEDERALLY SPONSORED RESEARCH AND DEVELOPMENT

This invention was made with government support under Grant No. ATM0331591 awarded by the National Science Foundation. The government has certain rights in the invention.

BACKGROUND

The monitoring and prediction of thunderstorms has been an active and flourishing modern discipline, especially due to the advent of various new technologies including the scanning Doppler weather radar. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth.

The maximum range of weather radar is usually more than 150 km, while the minimum resolved scale can be 100 to 200 m. The radar observations can be updated in a few minutes. Weather radar has become one of the primary tools for monitoring and forecasting the severe storms that may extend tens to hundreds of kilometers, yet whose scale is still relatively small compared to the synoptic scale of the earth. Many high impact and severe weather phenomena are the meso-scale or the storm-scale systems, having the lifetime from a few tens of minutes to a few hours. So the very short term forecasting of thunderstorms is particularly important to various end users, such as the airport transportation, the highway traffic, the construction industry, the outdoor sporting and entertainment, the public safety management, resource (e.g., agriculture and forest) protection and management. The forecast of such type is termed as the nowcasting, which can be defined as the forecasting of thunderstorms for a very short time periods that are less than a few hours, for example, up to twelve hours.

Many systems predict thunderstorms in the short term using tracking and extrapolation of radar echoes. Some techniques track storms using distributed "motion-field" based storm trackers, another is the "centroid" storm cell tracker. Beyond these techniques, many statistical and numerical models have been used. Despite the litany of research in this area, there remains a need in the art for improved nowcasting techniques.

BRIEF SUMMARY

Embodiments of the invention can predict the ground location and intensity of storm cells for a future time using radar reflectivity data. In some embodiments, a Sinc approximation of the general flow equation can be solved to predict the ground location and intensity of a storm cell. In some embodiments, to solve the Sinc approximation the velocity of a storm cell can first be estimated using any of various techniques such as solving the flow equation in the frequency domain. The velocity data can then be used to predict the future position of a storm cell in the ground plane from the solution to the Sinc approximation.

The following detailed description, together with the accompanying drawings, will provide a better understanding of the nature and advantage of the embodiments disclosed herein.

DETAILED DESCRIPTION

Figure 1:
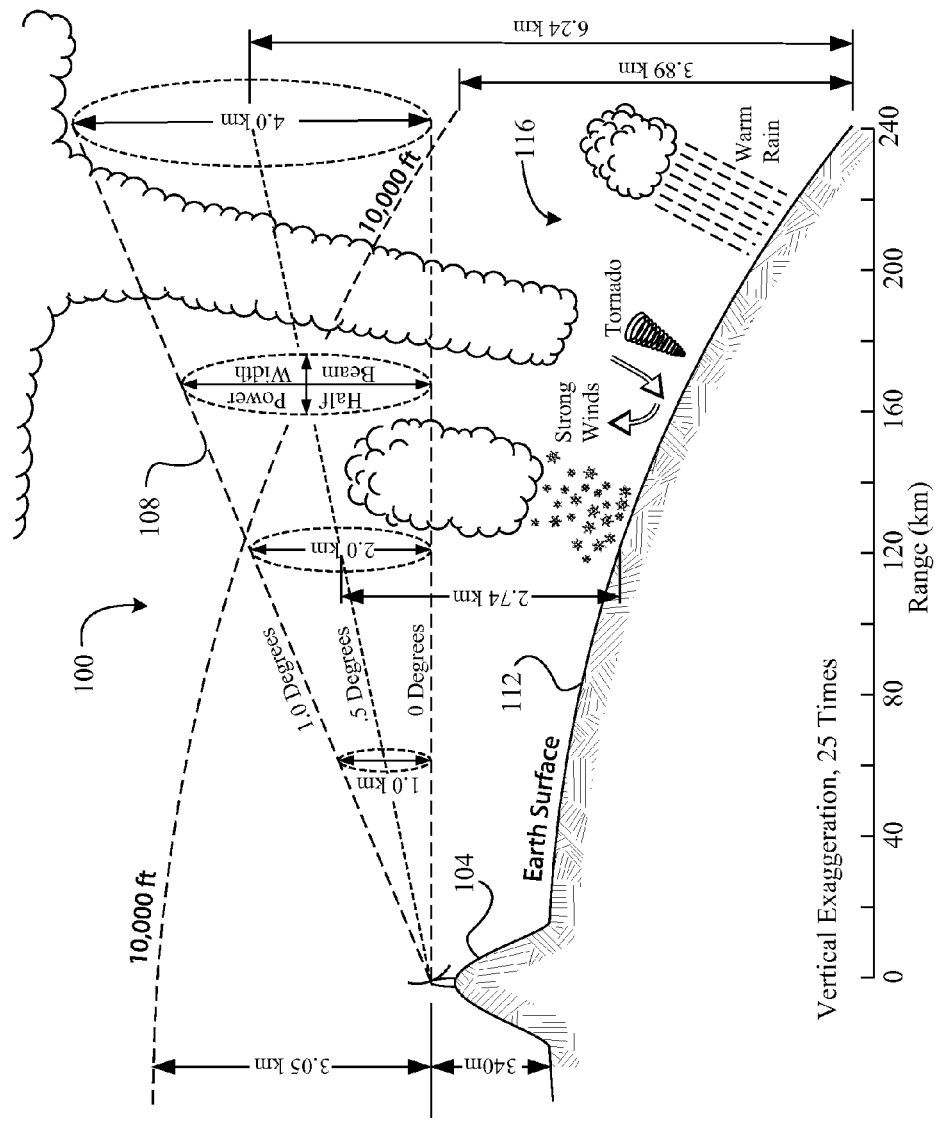
FIG. 1 provides a schematic illustration of the operation of a conventional radar system (reproduced from the National Academy of Sciences Report, "Flash flood forecasting over complex terrain").

Some embodiments of the invention can apply an efficient advection algorithm for predicting future position of radar reflectivity data in nowcasting applications. Weather radar observation can be viewed as a dynamic system with a 4-dimensional space-time formulation. In some embodiments, the identification and application of storm motion for predicting a storms future location and/or the storms can be a key component of storm tracking and/or nowcasting. In some embodiments, storm motion can be estimated from a series of historical images of radar reflectivity or other techniques. Using this velocity data with a Sinc approximation to the flow equation, the future position and/or reflectivity of the storm cell can be determined. Because radar observations can form high dimensional data due to its high resolution, the advection process, for example, can be efficient and/or accurate for practical use in radar operation.

The objective in nowcasting is to predict the ground location and intensity of storm cells within a radar observation field for a future time that can vary from a few minutes to a few hours. The radar observation field (e.g., radar reflectivity) can be described as a 2-dimensional spatiotemporal process F(x,y,t), where x and y define Cartesian locations and t defines the time. The general motion-flow equation for the field F(x,y,t) can be written as $$\frac{\partial}{\partial t}F(x, y, t) = -U(x, y)\frac{\partial}{\partial x}F(x, y, t) - V(x, y)\frac{\partial}{\partial y}F(x, y, t) + S(x, y, t) \quad (1)$$

In Eq 1 U(x,y) is the x-axis motion velocity and V(x,y) is the y-axis motion velocity over the spatial domain, and S(x,y,t) generally represents other evolutionary mechanisms, such as growth and decay of the storm. Without loss of generality, S(x,y,t) can be dropped in this study because it can be approximated as a source to the process F(x,y,t).

The advection (e.g., the horizontal transport of atmospheric properties) of F(x,y,t) can be evaluated iteratively with multiple finite, discrete time steps, as $$F(x, y, t+\delta_t) = F(x, y, t) - \quad (2)$$
$$U(x, y)\delta_t \frac{\partial}{\partial x}F(x, y, t) - V(x, y)\delta_t \frac{\partial}{\partial y}F(x, y, t)$$

In some embodiments, several observations should be in place for a proper numerical evaluation of this advection and/or its implementation. Because the radar field is a discrete, sampled version of the physical process F(x,y,t) the radar field's spatial resolution can vary from meters to hundreds of meters to kilometers depending on the type of radar used. The motion velocity can range from several meters per second to hundreds of meters per second. Within a small time step (e.g., $\delta_t$), the advection may move F(x,y,t) only a fraction of a spatial grid. In some embodiments, derivatives with respect to x and y can be evaluated at nearly every or every grid point of the radar field. Therefore, in some embodiments, high order interpolation can be considered an essential part of this numerical advection process; otherwise, the numerical errors can be accumulated through multiple iteration steps and become substantial compared to storm motion. Embodiments of the present invention can solve Eq 2 with the appropriate order of interpretation using previously estimated motion velocities U(x,y) and V(x,y).

In some embodiments, a numerical algorithm based on Sinc kernel expansion (e.g. Sinc approximation) can be used for computing the advection of radar reflectivity. Such an expansion can be composed of Sinc basis functions and/or can be directly applied to the regular grids of the sampled reflectivity field. The reflectivity field can be modeled as a continuous function F(x,y,t) over the spatial domain. At a fixed time t, discrete observations on regular grids can be viewed as the discrete samples of this continuous function in a bounded two-dimensional region. It can be assumed that F(x,y,t) is band-limited with a bandwidth less than $w_i = (2\Delta_i)^{-1}$, where i=x or y and $\Delta_i$ is the sampling interval on the x or the y axis. According to the Whittaker-Shannon-Kotelnikov sampling theorem, the reflectivity field F(x,y,t) can be reconstructed from its discrete samples as $$F(x, y, t) = \sum_{k=1}^{N_x} \sum_{l=1}^{N_y} F_{kl}(t) \times \operatorname{Sinc}\left(\frac{x}{\Delta_x} - k\right) \times \operatorname{Sinc}\left(\frac{y}{\Delta_y} - l\right) \quad (3)$$

where $$F_{kl}(t) \equiv F(k \cdot \Delta_x, l \cdot \Delta_y, t) \quad (4)$$

The equidistant samples of F(x,y,t), namely, $F_{kl}(t)$, may be interpreted as the coefficients of the functional expansion that can be obtained by translating and rescaling Sinc kernels. The approximation in Eq 3 is built on a finite set of discrete samples. However, for a function well confined within a bounded spectrum, it can give an accurate approximation since the Sinc basis is appropriately localized.

The continuous function in Eq 3 can be used to analytically calculate the spatial derivatives in Eq 1. This leads to following equations, the discrete forms for Eq 1 and Eq 2, as $$\frac{\partial}{\partial t}F_{kl}(t) = -\frac{U_{kl}}{\Delta_x}[AF(t)]_{kl} - \frac{V_{kl}}{\Delta_y}[F(t)Z]_{kl} \quad (5)$$

$$F_{kl}(t+\delta_t) = F_{kl}(t) - \delta_t\left\{\frac{U_{kl}}{\Delta_x}[AF(t)]_{kl} + \frac{V_{kl}}{\Delta_y}[F(t)Z]_{kl}\right\} \quad (6)$$

where matrices A, Z and F(t) are defined by $$A \equiv [A_{km}] \equiv [\operatorname{dSinc}(k-m)] \quad (7)$$

$$Z \equiv [Z_{nl}] \equiv [\operatorname{dSinc}(l-n)] \quad (8)$$

$$F(t) \equiv [F_{ml}(t)] \text{ or } F(t) \equiv [F_{kn}(t)] \quad (9)$$

and dSinc stands for the derivatives of Sinc function:

$$\operatorname{dSinc}(x) \equiv \frac{d}{dx}\operatorname{Sinc}(x) = \begin{cases} \frac{1}{x}[\cos(\pi x) - \operatorname{Sinc}(x)] & x \neq 0 \\ 0 & x = 0. \end{cases} \quad (10)$$

The above equations show that the numerical advection can be conducted by the matrix-based computation, and the temporal integration is done by the iteration of matrix computations at small steps. In some embodiments no heuristic and sophisticated redistribution or interpolation procedures are carried out. Thus, prediction of the reflectivity field at a future time $\delta_t$ can be determined using Eq 6 using previously calculated velocities at points the two-dimensional space.

Figure 2:
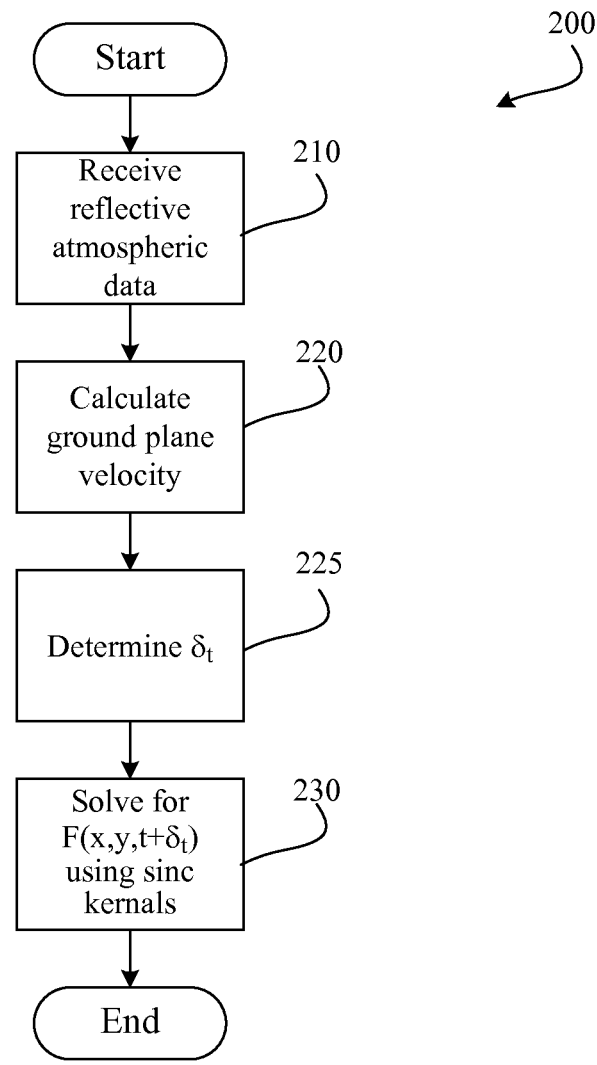
FIG. 2 shows a flowchart of a process for predicting the ground location and intensity of storm cells for a future time according to some embodiments.

FIG. 2 shows a flowchart of process 200 for predicting the reflectivity field at a future time $\delta_t$ using Sinc approximations according to some embodiments. At block 210 reflectivity data can be received. For example, the reflectivity data can be received directly from a radar system or retrieved from memory (e.g., memory 418 in FIG. 4 or any data storage device whether internal or external to a computer system). The retrieved reflectivity data can provide an intensity measurement that represents the reflectivity for a point in the region of interest defined by the position of the point and the time. Because Eq 6 operates in two dimensions, advection can be solved in a horizontal plane (e.g. a plane parallel to the ground) at a given time (e.g. the current time). The horizontal plane can include any plane parallel to the ground. A plane can be selected from the retrieved reflectivity data.

At block 220, the velocity can be estimated for points within the horizontal plane of interest. For example, the x-direction velocity, U(x,y), and the y-direction velocity, V(x,y), can be estimated using any number of techniques including solutions produced by solving the flow equation in the frequency domain and/or using a least square approximations. At block 225 the future time, $\delta_t$, can be selected, for example, $\delta_t$ can be retrieved from memory and/or received from a user. At block 230, the future reflectivity field at altitude can be calculated using, for example, Eq 6. In some embodiments, prediction the reflectivity field can be provided at other altitudes.

In some embodiments, the x-direction velocity U(x,y) and the y-direction velocity V(x,y) can be determined from the general flow equation for the radar observation field F(x, y, t). Eq 1 shows the flow equation expressed in Euler space, in which the radar observational field F(x, y, t) can be conveniently represented. A discrete version of F(x, y, t) may be written as F(i, j, k). The differential equation can be rewritten in the frequency domain, in the discrete form as $$k_t F_{DFT}(k_x, k_y, k_t) = -\left[\frac{1}{N_x N_y}\right] \quad (11)$$

$$\sum_{k_x=N_x^-}^{N_x^+} \sum_{k_y=N_y^-}^{N_y^+} \left[\frac{U_{DFT}(k_x', k_y')}{T_x/T_t}\right](k_x - k_x') DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right](k_y - k_y')$$

$$DFT(k_x - k_x', k_y - k_y', k_t) -$$

$$\left(\frac{i}{2\pi}\right)[T_t \cdot S_{DFT}(k_x, k_y, k_t)];$$

where $F_{DFT}$ includes the 3D Discrete Fourier Transform (DFT) coefficients of the observed radar field F(i, j, k), which are discrete space-time observations. $U_{DFT}$ includes the 2D DFT coefficients of U(i, j), $V_{DFT}$ include the 2D DFT coefficients of V(i, j) and $S_{DFT}$ include the 3D DFT coefficients of S(i, j, k), which are unknowns to be estimated. From Eq 11, one can solve for $U_{DFT}$ and $V_{DFT}$, for example, using a least squares fit algorithm.

It should be noted that, Eq 11 provides a linear inversion problem when the $F_{DFT}$ coefficients are known, so as to estimate $U_{DFT}$, $V_{DFT}$ and $F_{DFT}$. By choosing fewer leading coefficients among the coefficients of $U_{DFT}$, $V_{DFT}$ and $S_{DFT}$, Eq 11 may form an over-determined linear system that can be solved, for example, using a linear least squares estimation method. In Eq 11, various scales of the storm can be controlled by choosing the desired leading coefficients among $F_{DFT}$, provided that the resulting equation forms an over-determined linear system. This can generally be achieved when the motion field ($U_{DFT}$ and $V_{DFT}$) and the S-term ($S_{DFT}$) have much fewer leading coefficients than the radar field ($F_{DFT}$).

The following describes a mathematical solution that provides Eq 5 from Eq 3, the Sinc kernel approximation to analytic functions, and Eq 4, discrete samples over the spatial domain. The temporal and spatial derivatives of F(x,y,t) can be determined as follows.

$$\frac{\partial}{\partial t} F(x, y, t)\bigg|_{\substack{x=k\cdot\Delta_x \\ y=l\cdot\Delta_y}} = \sum_{m=1}^{N_x} \sum_{n=1}^{N_y} \left[\frac{\partial}{\partial t} F_{mn}(t)\right] \times \text{Sinc}\left(\frac{x}{\Delta_x} - m\right) \times \quad (A1)$$

$$\text{Sinc}\left(\frac{y}{\Delta_y} - n\right)\bigg|_{\substack{x=k\cdot\Delta_x \\ y=l\cdot\Delta_y}}$$

$$= \sum_{m=1}^{N_x} \sum_{n=1}^{N_y} \left[\frac{\partial}{\partial t} F_{mn}(t)\right] \times$$

$$\text{Sinc}(k-m) \times \text{Sinc}(l-n)$$

$$= \sum_{m=1}^{N_x} \sum_{n=1}^{N_y} \left[\frac{\partial}{\partial t} F_{mn}(t)\right] \times \delta_{mk} \times \delta_{nl}$$

$$= \frac{\partial}{\partial t} F_{kl}(t)$$

$$\frac{\partial}{\partial x} F(x, y, t)\bigg|_{\substack{x=k\cdot\Delta_x \\ y=l\cdot\Delta_y}} = \sum_{m=1}^{N_x} \sum_{n=1}^{N_y} F_{mn}(t) \times \left[\frac{\partial}{\partial x} \text{Sinc}\left(\frac{x}{\Delta_x} - m\right)\right] \times \quad (A2)$$

$$\text{Sinc}\left(\frac{y}{\Delta_y} - n\right)\bigg|_{\substack{x=k\cdot\Delta_x \\ y=l\cdot\Delta_y}}$$

$$= \sum_{m=1}^{N_x} \sum_{n=1}^{N_y} F_{mn}(t) \times \left[\frac{1}{\Delta_x} \cdot d\text{Sinc}(k-m)\right] \times$$

$$\text{Sinc}(l-n)$$

$$= \sum_{m=1}^{N_x} \left[\sum_{n=1}^{N_y} F_{mn}(t) \times \delta_{nl}\right] \times$$

$$\left[\frac{1}{\Delta_x} d\text{Sinc}(k-m)\right]$$

$$= \frac{1}{\Delta_x} \sum_{m=1}^{N_x} d\text{Sinc}(k-m) \cdot F_{ml}(t)$$

$$= \frac{1}{\Delta_x} [AF(t)]_{kl}$$

$$\frac{\partial}{\partial y} F(x, y, t)\bigg|_{\substack{x=k\cdot\Delta_x \\ y=l\cdot\Delta_y}} = \sum_{m=1}^{N_x} \sum_{n=1}^{N_y} F_{mn}(t) \times \text{Sinc}\left(\frac{x}{\Delta_x} - m\right) \times \quad (A3)$$

$$\left[\frac{\partial}{\partial y} \text{Sinc}\left(\frac{y}{\Delta_y} - n\right)\right]\bigg|_{\substack{x=k\cdot\Delta_x \\ y=l\cdot\Delta_y}}$$

$$= \sum_{m=1}^{N_x} \sum_{n=1}^{N_y} F_{mn}(t) \times \text{Sinc}(k-m) \times$$

$$\left[\frac{1}{\Delta_y} d\text{Sinc}(l-n)\right]$$

$$= \sum_{n=1}^{N_y} \left[\sum_{m=1}^{N_x} F_{mn}(t) \times \delta_{km}\right] \times$$

$$\left[\frac{1}{\Delta_y} d\text{Sinc}(l-n)\right]$$

$$= \frac{1}{\Delta_y} \sum_{n=1}^{N_y} F_{kn}(t) \cdot d\text{Sinc}(l-n)$$

$$= \frac{1}{\Delta_y} [F(t)Z]_{kl}$$

where the elements of matrices A, Z and F(t) are defined in Eqs 7, 8 and 9.

Plugging Eqs A1, A2 and A3 into the following linear passive advection equation $$\left\{\frac{\partial}{\partial t}F(x,y,t)\right\}\bigg|_{\substack{x=k\cdot\Delta_x \\ y=l\cdot\Delta_y}} = \left\{\begin{array}{c} -U(x,y)\cdot\frac{\partial}{\partial x}F(x,y,t) - \\ V(x,y)\cdot\frac{\partial}{\partial y}F(x,y,t) \end{array}\right\}\bigg|_{\substack{x=k\cdot\Delta_x \\ y=l\cdot\Delta_y}} \quad (A4)$$

$$= -U(x,y)\bigg|_{\substack{x=k\cdot\Delta_x \\ y=l\cdot\Delta_y}} \cdot \frac{\partial}{\partial x}F(x,y,t)\bigg|_{\substack{x=k\cdot\Delta_x \\ y=l\cdot\Delta_y}} -$$

$$V(x,y)\bigg|_{\substack{x=k\cdot\Delta_x \\ y=l\cdot\Delta_y}} \cdot \frac{\partial}{\partial y}F(x,y,t)\bigg|_{\substack{x=k\cdot\Delta_x \\ y=l\cdot\Delta_y}}$$

leads to Eq 5. In above equations, dSinc(x) is the derivative of Sinc function, which is given by $$d\mathrm{Sinc}(x) \equiv \frac{d}{dx}\mathrm{Sinc}(x) = \begin{cases} \frac{1}{x}[\cos(\pi x) - \mathrm{Sinc}(x)] & x \neq 0 \\ 0 & x = 0. \end{cases} \quad (A5)$$

Figure 3:
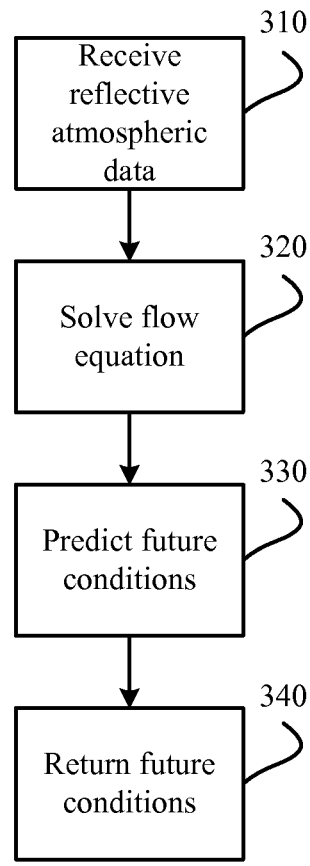
FIG. 3 shows a flowchart of a process for predicting future atmospheric motion conditions of a storm cell according to one embodiment of the invention.
Figure 4:
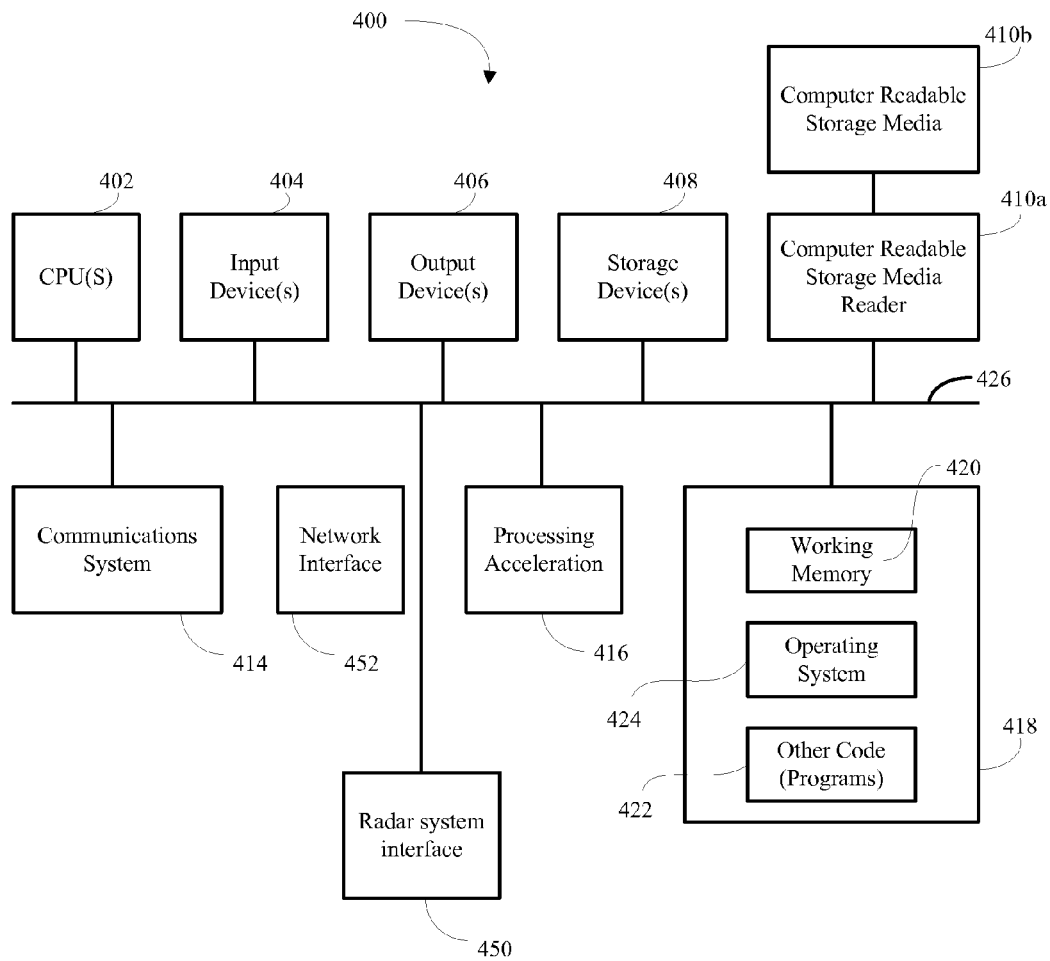
FIG. 4 shows a block diagram of the receiver side of a weather radar system according to some embodiments.

FIG. 4 shows a block diagram of a computer system 400 that can be coupled with a radar system for computation of environmental parameters using various embodiments of the invention. Computer system 400 can be used to perform any or all the processes or computations shown in FIG. 2 and/or FIG. 3 and/or calculate a future reflectivity field. The drawing illustrates how individual system elements can be implemented in a separated or more integrated manner. The computer 400 is shown having hardware elements that are electrically coupled via bus 426. Network interface 452 can communicatively couple the computational device 400 with another computer, for example, through a network such as the Internet. The hardware elements can include a processor 402, an input device 404, an output device 406, a storage device 408, a computer-readable storage media reader 410a, a communications system 414, a processing acceleration unit 416 such as a DSP or special-purpose processor, and memory 418. The computer-readable storage media reader 410a can be further connected to a computer-readable storage medium 410b, the combination comprehensively representing remote, local, fixed, and/or removable storage devices plus storage media for temporarily and/or more permanently containing computer-readable information.

Radar system interface 450 is coupled with bus 426. In some embodiments, radar system interface 450 can be any type of communication interface. For example, radar system interface 450 can be a USB interface, UART interface, serial interface, parallel interface, etc. Radar system interface 450 can be configured to couple directly with a radar system and receive radar reflectivity data therefrom.

The computer system 400 also comprises software elements, shown as being currently located within working memory 420, including an operating system 424 and other code 422, such as a program designed to implement methods and/or processes described herein. In some embodiments, other code 422 can include software that provides instructions for receiving user input from a dual polarization radar system and manipulating the data according to various embodiments disclosed herein. In some embodiments, other code 422 can include software that can predict or forecast weather events, and/or provide real time weather reporting and/or warnings. It will be apparent to those skilled in the art that substantial variations can be used in accordance with specific requirements. For example, customized hardware might also be used and/or particular elements might be implemented in hardware, software (including portable software, such as applets), or both. Further, connection to other computing devices such as network input/output devices can be employed.

A quantitative assessment of the applicability of Sinc kernal expansion for nowcasting in regards the "numerical dispersion" and the "numerical diffusion" can be made. In doing so, an observed two-dimensional reflectivity map is used as the initial data. The discrete reflectivity data are samples of a band-limited continuous function. To assure a simple analytic solution, we use a constant and uniform motion field over the spatial domain, namely, U(x,y)=V(x,y)=0.5 grid/step. With total steps of 40, the discrete samples of the final analytic solution to the advection is a reflectivity map obtained by shifting the initial map by 20×20 grids.

Figure 5A:
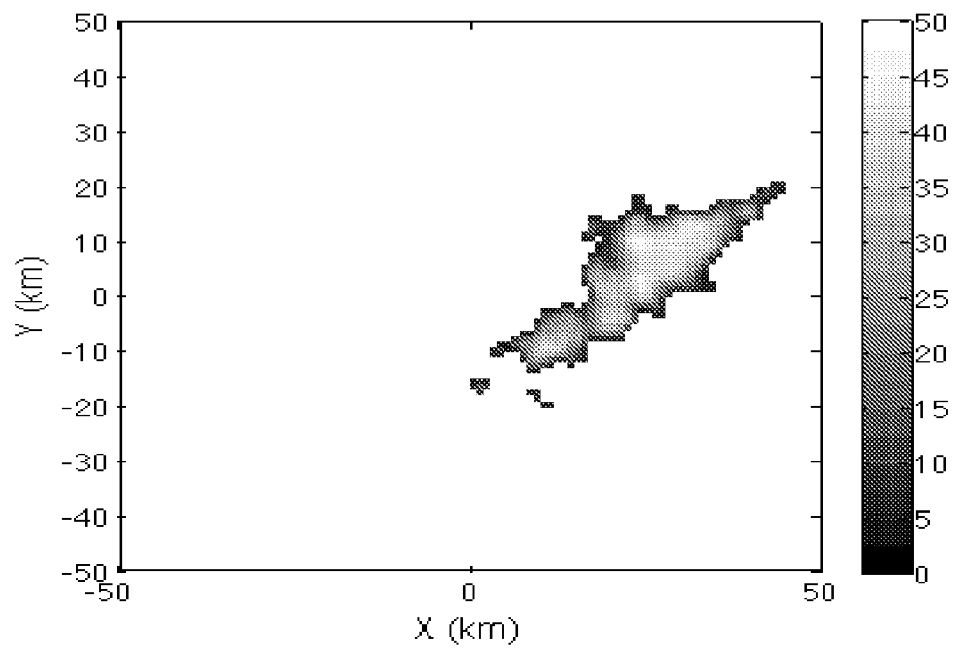
FIG. 5A shows an analytic prediction to a known reflectivity map.
Figure 5B:
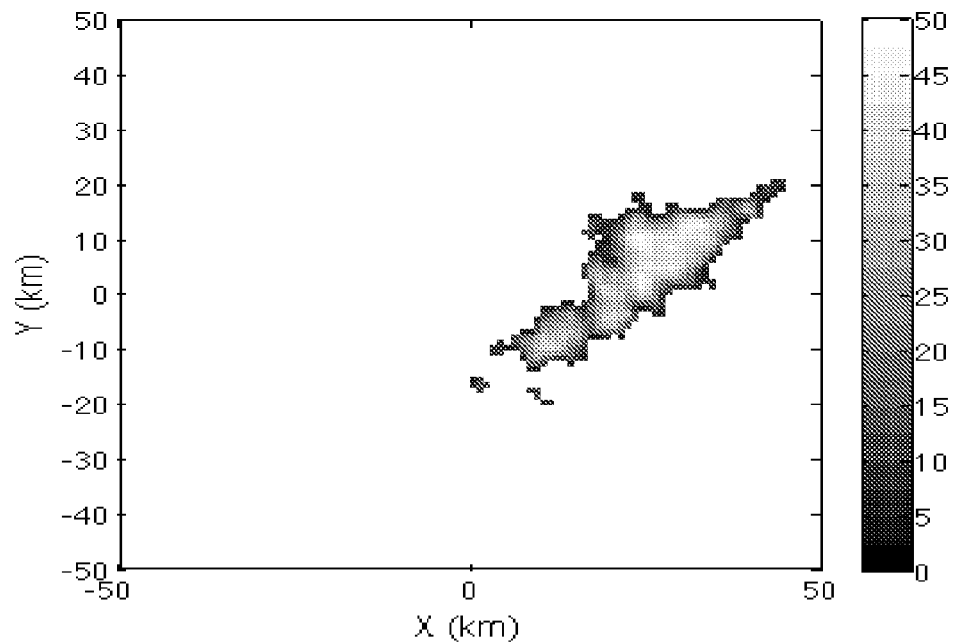
FIG. 5B shows a Sinc approximation predication to the known reflectivity map used in FIG. 5A.
Figure 6:
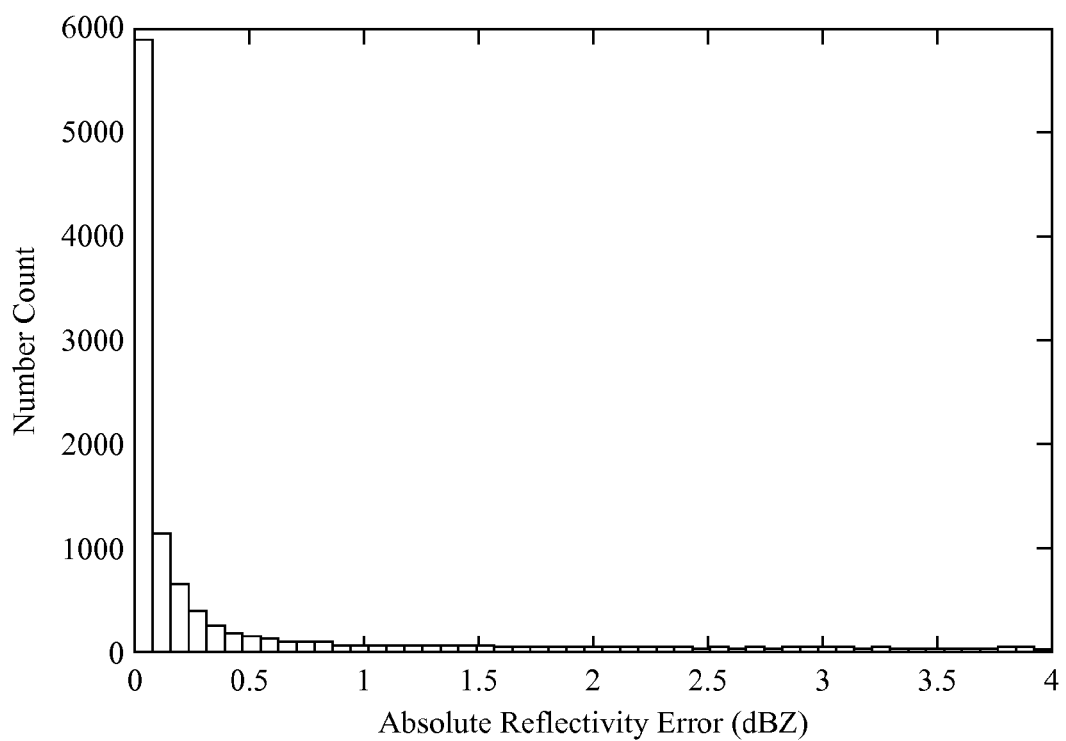
FIG. 6 shows a histogram of absolute errors between the analytic result and the Sinc approximation for the reflectivity maps shown in FIG. 5A and FIG. 5B.
Figure 7:
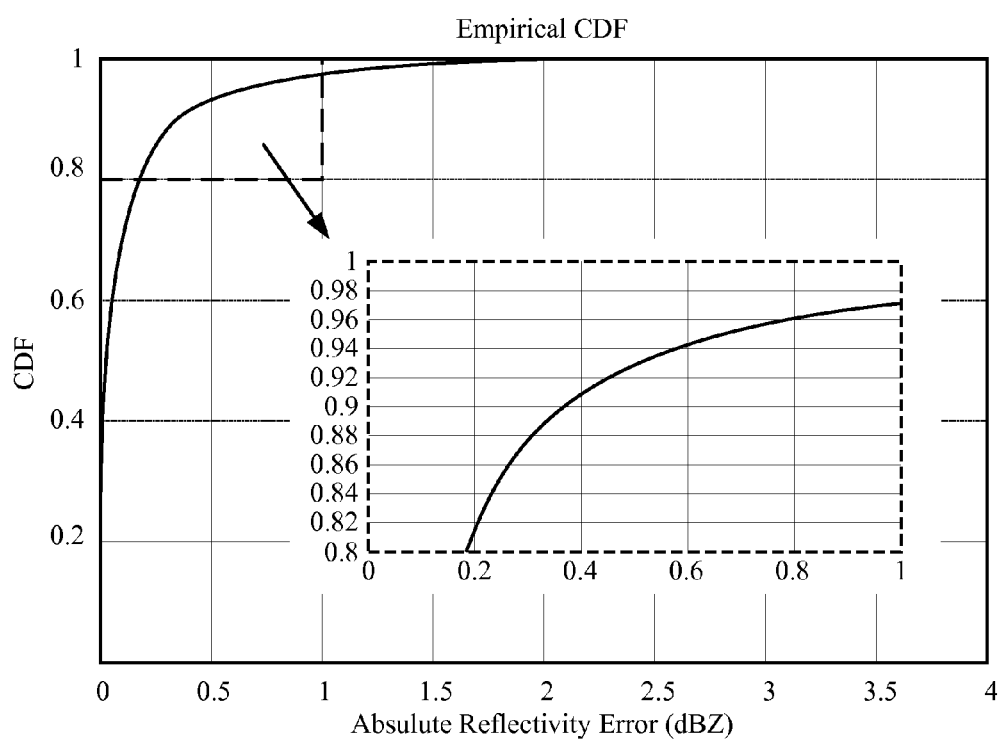
FIG. 7 shows a graph of the empirical cumulative distribution functions (CDF) for the reflectivity maps shown in FIG. 5A and FIG. 5B.

To study the numerical dispersion of the Sinc approximation, we compare the analytic result and compare it with the reflectivity map computed using the Sinc approximation. The analytic results are shown in FIG. 5A and the results computed using the Sinc approximation are shown in FIG. 5B. For the quantitative comparison of reflectivity maps (FIG. 5A v.s. FIG. 5B), the equivalent signal-to-noise-ratio (SNR) is 25.5 dB. The histograms of absolute errors between the analytic result and the Sinc approximation for reflectivity maps are presented in FIG. 6. The corresponding empirical cumulative distribution functions (CDF) are shown in FIG. 7. As can be seen from the CDF curve that more than 95% of these absolute errors are less than 0.8 dBZ. It can be conclude that the numerical dispersion of Sinc approximation for the reflectivity advection causes insignificant increase in variances of the radar reflectivity fields. A threshold to the computed reflectivity map can be applied, so as to filter out the slight false variance, and have empirically determined the best threshold value to be 10 dBZ.

Figure 8:
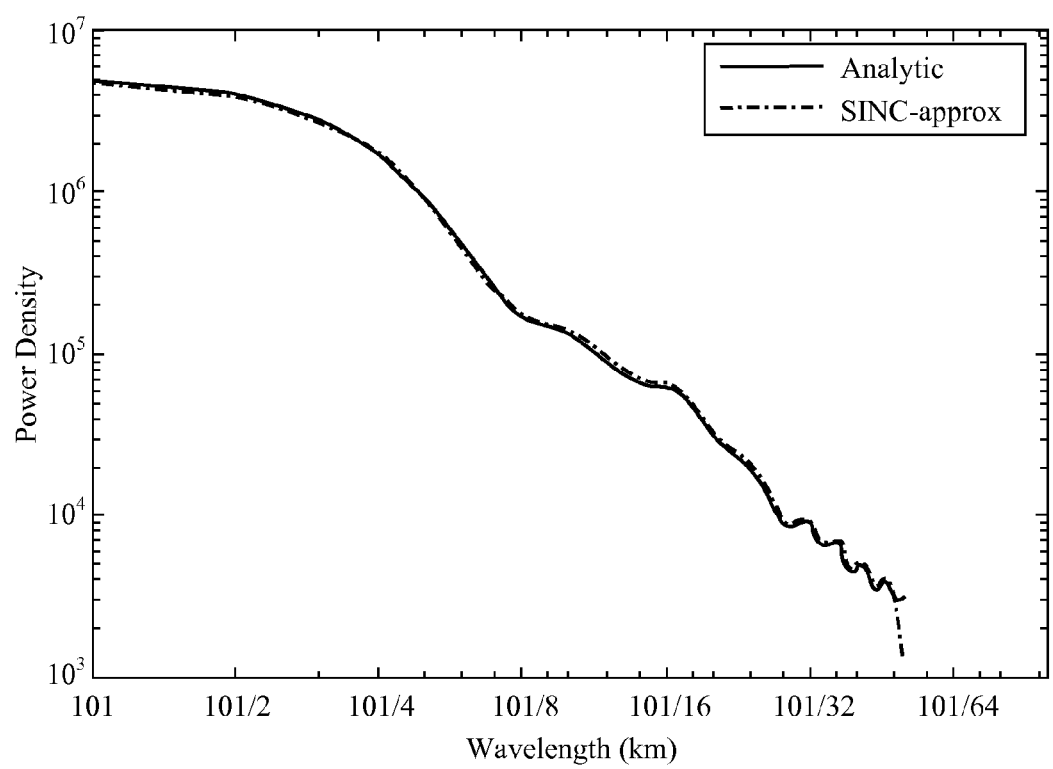
FIG. 8 shows a comparison of the averaged one dimensional power spectra along the x-axis for the reflectivity maps shown in FIG. 5A and FIG. 5B.
Figure 9:
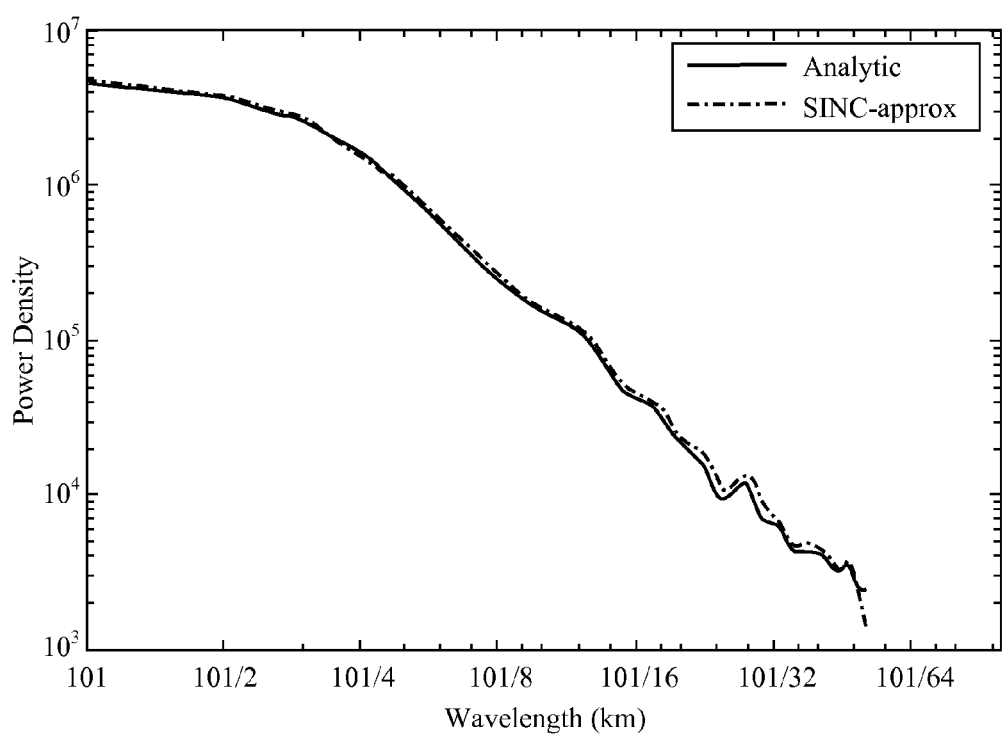
FIG. 9 shows a comparison of the averaged one dimensional power spectra along the y-axis for the reflectivity maps shown in FIG. 5A and FIG. 5B.

To study the numerical diffusion of the Sinc approximation, the average one-dimensional power spectrum for both analytic reflectivity map and Sinc approximation reflectivity map can be computed and compared. The average one-dimensional power spectrum is computed along either x-axis or y-axis. Averaged one-dimensional power spectra are shown in FIG. 8 and FIG. 9, from which shows that the comparison is nearly the perfect match. No diffusion effect is detected almost down to the smallest available scale (2 km). The Sinc approximation for reflectivity advection exhibits undetectable "numerical diffusion", as the proposed advection algorithm does not introduce any heuristic redistribution procedures and the spatial derivatives are approximated by the analytic function.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While prediction and nowcasting of storm fields using reflectivity data is described herein with reference to particular blocks, it should be understood that the blocks are defined for convenience of description and are not intended to imply a particular physical arrangement of component parts. Further, the blocks need not correspond to physically distinct components.

While the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or digital versatile disk (DVD), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

What is claimed is:

1. A radar system for nowcasting weather patterns within a region of interest, the system comprising:
   a radar source configured to propagate a radar signal;
   a radar detector configured to collect radar data; and
   a computational system in communication with the radar source and with the radar detector, the computational system comprising a processor and a memory coupled with the processor, the memory comprising a computer-readable medium having a computer-readable program embodied therein for direction operation of the radar system to investigate the region of interest, the computer-readable program including:
      instructions for propagating the radar signal into the region of interest with the radar source;
      instructions for collecting sampled radar reflectivity data from within the region of interest with the radar detector, wherein the sampled radar reflectivity data represents a reflectivity of the radar signal at points within the region of interest;
      instructions for selecting a horizontal two-dimensional data set from the sampled radar reflectivity data;
      instructions for determining a velocity for data points within the horizontal two-dimensional data set;
      instructions for predicting a horizontal location of data points within the horizontal data set at a future time using a Sinc approximation of the general flow equation and the velocity for data points within the horizontal two-dimensional data set; and
      instructions for returning the predicted horizontal location of the data points at the future time.

2. The radar system according to claim 1 wherein the computer-readable program further includes instructions for predicting the intensity of data points within the horizontal data set at a future time using a Sinc approximation of the general flow equation and the velocity for data points within the horizontal two-dimensional data set.

3. The radar system according to claim 1 wherein the computer-readable program further includes instructions for predicting the reflectivity of data points within the horizontal data set at the future time.

4. The radar system according to claim 1 wherein the Sinc approximation of the general flow equation comprises:

$$F_{kl}(t+\delta_t) = F_{kl}(t) - \delta_t \left\{ \frac{U_{kl}}{\Delta_x}[AF(t)]_{kl} + \frac{V_{kl}}{\Delta_y}[F(t)Z]_{kl} \right\}$$

where U.sub.kl is the x-axis velocity at data point k-l, and V.sub.kl is the y-axis velocity at data point k-l.

5. The radar system according to claim 1 wherein the instructions for determining a velocity comprises instructions for determining an x-axis velocity and a y-axis velocity by solving a flow equation in the frequency domain for the horizontal two-dimensional data set.

6. The radar system according to claim 5 wherein the flow equation in the frequency domain comprises $$k_t F_{DFT}(k_x, k_y, k_t) =$$

$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right](k_x - k_x')DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right](k_y - k_y')DFT(k_x - k_x', k_y - k_y', k_t) -$$

$$\left(\frac{i}{2\pi}\right)[T_t \cdot S_{DFT}(k_x, k_y, k_t)].$$

7. A method for predicting the position of a storm field, the method comprising:
   propagating a radar signal in to the region of interest;
   collecting sampled time domain radar data scattered from within the region of interest, wherein the sampled time domain radar data represents a reflectivity of the radar signal at points within the region of interest;
   determining an x-axis velocity and a y-axis velocity for data points within the sampled time domain radar data; and
   predicting the future position of data points within the storm field by solving a flow equation using the velocity for data points within the horizontal two-dimensional data set and a Sinc kernel expansion.

8. The method according to claim 7 further comprising predicting the intensity of data points within the storm field by solving a flow equation using the velocity for data points within the horizontal two-dimensional data set and a Sinc kernel expansion.

9. The method according to claim 7 wherein a solution to the general flow equation using a Sinc kernel expansion comprises $$F_{kl}(t+\delta_t) = F_{kl}(t) - \delta_t \left\{ \frac{U_{kl}}{\Delta_x}[AF(t)]_{kl} + \frac{V_{kl}}{\Delta_y}[F(t)Z]_{kl} \right\}.$$

10. The method according to claim 7 wherein the x-axis velocity and the y-axis velocity are determined by solving the flow equation in the frequency domain.

11. The method according to claim 7 the flow equation in the frequency domain includes:

$$k_t F_{DFT}(k_x, k_y, k_t) =$$

$$-\left[\frac{1}{N_x N_y}\right] \sum_{k_x=N_x^-}^{N_x^+} \sum_{k_y=N_y^-}^{N_y^+} \left[\frac{U_{DFT}(k_x', k_y')}{T_x/T_t}\right](k_x - k_x')DFT(k_x - k_x', k_y - k_y', k_t) -$$

$$\left[\frac{1}{N_x N_y}\right] \sum_{k_x=N_x^-}^{N_x^+} \sum_{k_y=N_y^-}^{N_y^+} \left[\frac{V_{DFT}(k_x', k_y')}{T_y/T_t}\right](k_y - k_y')DFT(k_x - k_x', k_y - k_y', k_t) -$$

$$\left(\frac{i}{2\pi}\right)[T_t \cdot S_{DFT}(k_x, k_y, k_t)].$$

12. A method comprising:
propagating a radar signal in to the region of interest;
collecting reflectivity radar data scattered from within the region of interest, wherein the reflectivity radar data represents reflectivity of the radar signal as a function of position within the region of interest;
determining a velocity at points within the region of interest; and
predicting the future location of points within the region of interest using a Sinc approximation of a flow equation and the velocity for data points within the horizontal two-dimensional data set.

13. The method according to claim 12 further comprising predicting the future intensity of points within the region of interest using a Sinc approximation of a flow equation and the velocity for data points within the horizontal two-dimensional data set.

14. The method according to claim 12 wherein the velocity includes orthogonal velocities estimated from the flow equation.

15. The method according to claim 12 wherein a solution to the Sinc approximation of the flow equation at future time comprises $$F_{kl}(t + \delta_t) = F_{kl}(t) - \delta_t \left\{ \frac{U_{kl}}{\Delta_x}[AF(t)]_{kl} + \frac{V_{kl}}{\Delta_y}[F(t)Z]_{kl} \right\}.$$

* * * * *